United States Patent

Assogna et al.

Patent Number: 5,171,794
Date of Patent: Dec. 15, 1992

[54] MODIFIED POLY(2,6-DIMETHYL-P-OXYPHENYLENE), A PROCESS FOR ITS PREPARATION AND ITS USE IN GAS MIXTURE SEPARATION MEMBRANES

[75] Inventors: Amalia Assogna, Riano; Alberto Gandini, Milan; Arnaldo Roggero, San Donato Milanese; Raffaello Sisto, Rome; Alessandro Stopponi, Monterotondo; Claudio Valentini, Rome, all of Italy

[73] Assignees: Eniricerche S.p.A.; Snam S.p.A., both of Milan; Agip Petroli S.p.A., Rome, all of Italy

[21] Appl. No.: 550,864

[22] Filed: Jul. 10, 1990

[30] Foreign Application Priority Data

Jul. 11, 1989 [IT] Italy ................. 21149 A/89

[51] Int. Cl.⁵ ............................. C08G 65/48
[52] U.S. Cl. ..................... 525/393; 525/390; 525/396
[58] Field of Search ............ 525/390, 393, 396

[56] References Cited

U.S. PATENT DOCUMENTS 3,402,144  9/1968  Hay ........................ 260/47
4,686,131  8/1987  Sugio et al. ............. 428/158
5,019,631  5/1991  Farias et al. ............ 525/396

FOREIGN PATENT DOCUMENTS 160435  11/1985  European Pat. Off. .

Primary Examiner—Melvyn I. Marquis
Assistant Examiner—David E. Aylward
Attorney, Agent, or Firm—Hedman, Gibson & Costigan

[57] ABSTRACT

An amorphous modified poly(2,6-dimethyl-p-oxyphenylene) (PPO) is described with a glass transition temperature (Tg) within the range of 170°–220° C., of which the macromolecules contain units having trialkylsilyl groups bonded to the nucleus and/or to the methyl:

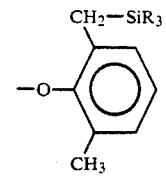

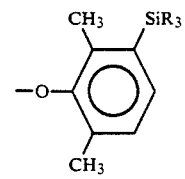

together with units having hydroxyethyl groups bonded to the nucleus and/or to the methyl:

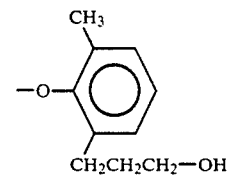

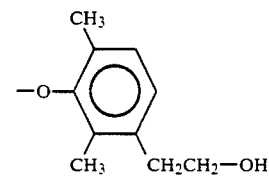

This modified PPO is prepared by metalating PPO with a metalating agent and reacting the formed metalated PPO with a trialkylsilyl halide and with ehtylene oxide in succession.

The use of the thus modified PPO for the preparation of flat, including asymmetric, membranes useful in gas mixture separation processes is described.

7 Claims, No Drawings

MODIFIED POLY(2,6-DIMETHYL-P-OXYPHENYLENE), A PROCESS FOR ITS PREPARATION AND ITS USE IN GAS MIXTURE SEPARATION MEMBRANES

This invention relates to an amorphous modified poly(2,6-dimethyl-p-oxyphenylene), a process for its preparation and its use in gas mixture separation membranes.

Gas-permeable polymer membranes are known in the art for use in separation processes for gas mixtures. The polymers used for this purpose can be chosen from a wide range such as silicone rubbers, natural rubber, butyl rubber, low-density polyethylene, polycarbonate, polysulphone, poly(2,6-dimethyl-p-oxyphenylene), polystyrene and cellulose acetate, as described for example by S. A. Stern, ACHEMA 1985, Plenary Lecture, and by H. B. Hopfenberg and V. T. Stannett in "Material Science of Synthetic Membranes", ACS Symposium, Series No. 269, Chapter 2.

Of these materials, poly(2,6-dimethyl-p-oxyphenylene) (hereafter abbreviated to PPO) possesses good gas permeability and good selection in gas mixture separation. Modified PPOs have also been proposed in the art which have improved permeability characteristics, such as the silylated PPO described in U.S. Pat. No. 4,686,131. As in the case of PPO itself, such a silylated PPO is however difficult to transform into asymmetric membranes of use in gas mixture separation. U.S. Pat. No. 5,019,631 describes an ethylhydroxylated PPO which has the basic advantage of easy transformability into asymmetric membranes by the phase inversion method, operating in a aqueous solvent as coagulant. Such an ethylhydroxylated PPO has however the drawback of poor gas permeability.

The object of the present invention is to obviate the drawbacks of the known art relative to modified PPO and its transformation into membranes for gas mixture separation. In particular it has been found possible, according to the present invention, to introduce both trialkylsilyl and hydroxethyl groups into the PPO to obtain a modified PPO which in addition to the advantages of selectivity and permeability to gas mixtures also possesses the advantage of easy transformability into membranes.

Thus a first aspect of the present invention is an amorphous modified poly(2,6-dimethyl-p-oxyphenylene) with a glass transition temperature (Tg) within the range of 170°-220° C., of which the macromolecules contain units having trialkylsilyl groups bonded to the nucleus and/or to the methyl:

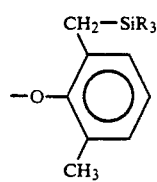

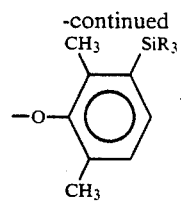

together with units having hydroxyethyl groups bonded to the nucleus and/or to the methyl:

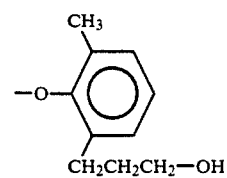

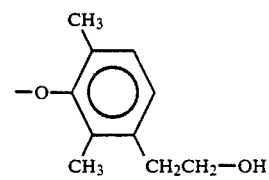

where:
R is an alkyl containing from 1 to 3 carbon atoms,
the sum of units (a) and units (b) varies from 20 to 80 per 100 moles of poly(2,6-dimethyl-p-oxyphenylene), and
the numerical ratio of units (a) to units (b) varies from 0.5/1 to 30/1.

In the preferred embodiment the amorphous modified poly(2,6-dimethyl-p-oxyphenylene) of the present invention has a glass transition temperature (Tg) of between 190° and 210° C., the sum of units (a) and (b) varies from 35 to 65 per 100 moles of poly(2,6-dimethyl-p-oxyphenylene), and the numerical ratio of units (a) to units (b) varies from 0.8/1 to 15/1.

Again in the preferred embodiment, R in units (a) indicates methyl.

In the description given hereinafter the poly(2,6-dimethyl-p-oxyphenylene) is abbreviated to PPO.

A further aspect of the present invention is a process for preparing the amorphous modified PPO having the aforesaid characteristics, comprising reacting PPO with a metalating agent to produce a metalated PPO, then reacting the metalated PPO with a trialkylsilyl halide and ethylene oxide in succession.

The PPO subjected to the process of the present invention is a known polymer having generally a weight-average molecular weight of between about 10,000 and about 80,000 and a polydispersity value (ratio of weight-average molecular weight to number-average molecular weight) of between about 1.4 and about 4.5, is prepared in the art by oxidative polymerization of 2,6-xylenol in the presence of a catalyst preferably chosen from copper complex catalysts.

The metalation of such a PPO is effected with the polymer dissolved in an inert organic solvent generally chosen from liquid aliphatic, cycloaliphatic and aromatic (e.g. benzene, toluene) hydrocarbons, and ethers (e.g. tetrahydrofuran). The metalating agent useful for this purpose can be an alkaline metal alkyl or an alkaline metal hydride or amide and preferably a lithium-alkyl (C1-C12), for example n-butyl lithium. The PPO metalation stage is normally carried out at a temperature of between −30° and 80° C. for a time of between 1 minute and 4 hours, using a ratio of moles of metalating agent to moles of PPO which depends on the desired extent of metalation taking account of the metalation reaction yield. Generally, this molar ratio of metalating agent to PPO can vary from 0.2/1 to 1/1. The PPO metalation is preferably conducted at ambient temperature (20°-25° C.) for a time of 15-30 minutes. The metalation can also be conducted in the presence of an activator normally chosen from tetramethylenediamine, potassium t-butylate and diazabicyclo-octane. When using the activator, useful values of the molar ratio of metalating agent to activator are between 1/0.5 and 1/1.

The metalated PPO obtained in this manner is reacted with a halogen trialkylsilane, operating with a ratio of moles of halogen trialkylsilane to metalated polymer centers of less than 1/1 depending on the desired extent of functionalization with trialkylsilyl groups, taking into account the previously indicated ranges. The reaction is conducted at a temperature of between 10° and 80° C. for a time of between a few minutes and 2 hours. The procedure is preferably carried out at 25°-60° C. for a reaction time of the order of 60 minutes. The halogen trialkylsilane is preferably chlorotrimethylsilane. Ethylene oxide is added to the reaction mixture obtained, in a quantity at least equivalent to the residual metalated centers after the reaction with the halogen trialkylsilane, operating at a temperature of between −30° and +80° C., for a time of between 30 minutes and 3 hours. In the preferred embodiment, the operation is carried out at 25°-60° C. for a reaction time of the order of 2 hours.

In this manner the modified PPO of the present invention is obtained, and is separated from the reaction mixture by the normal methods and then possibly purified. This modified PPO is an amorphous solid with a glass transition temperature (Tg) of between 170° and 220° C. and normally between 190° and 210° C. (DSC determination), containing unaltered monomer units together with monomer units modified (trialkylsilylated and ethylhydroxylated) at the methyl and at the nucleus as verified by nuclear magnetic resonance analysis (NMR) The substitutions on the methyl groups generally prevail, especially when the metalation is effected in non-polar solvents.

According to a further aspect the present invention provides a homogeneous or asymmetric flat membrane obtained from the described modified PPO. Specifically, the modified PPO of the present invention can be converted into a homogeneous flat membrane by the usual methods comprising dissolving the polymer in a suitable solvent (such as chloroform) and depositing the solution in the form of a thin layer on a suitable support. After controlled evaporation of the solvent, homogeneous dense flat membranes of modified PPO are obtained with a thickness generally varying from 1 to 120 $\mu m$ and preferably of the order of 1-50 $\mu m$, which are permeable to gas and selective in the separation of gaseous mixtures.

In the preferred embodiment the modified PPO of the present invention is transformed into the flat asymmetric membrane by the phase inversion method using water as coagulating agent.

Specifically, according to this method the modified PPO is dissolved in a solvent such as dimethylacetamide, dioxane, N-methyl-pyrrolidone, tetramethylurea, formyl-morpholine or formylpiperidine so as to form a solution containing from 5 to 30% of polymer by weight. The solution obtained is spread as a film over a support, such as a glass plate, and the coated support is placed in contact with a water coagulation bath to cause phase inversion and formation of the flat asymmetric membrane.

Such a membrane consists of a dense active skin with a thickness of the order of 0.1-10 $\mu m$ and a macroporous support layer the thickness of which can vary from 50 to 120 $\mu m$.

The flat asymmetric membranes according to the present invention are highly permeable and selective in separation processes for gaseous mixtures containing for example methane, carbon dioxide, nitrogen, oxygen, hydrogen and hydrogen sulphide.

The experimental examples given hereinafter better illustrate the present invention.

EXAMPLE 1-5

80 g (0.67 moles) of PPO are introduced into a 3 liter reactor fitted with a mechanical stirrer, a loading hopper and a dip thermometer and kept under nitrogen flow, and are dissolved in 2 liters of tetrahydrofuran (THF) operating at ambient temperature (20°-25° C. The PPO has the following characteristics: weight-average molecular weight 42,200 g/mole; ratio of weight-average molecular weight to number-average molecular weight (Mw/Mn) 2.5; intrinsic viscosity (25° C., chloroform) 0.5 dl/g; glass transition temperature (Tg) 221° C.

Variable quantities of n-butyl lithium (LiR) (from 0.27 to 0.67 moles) are added to the solution obtained depending on the desired PPO metalation, and the mixture left to react for a variable time of between 15 and 30 minutes. The PPO functionalization with the trimethylsilyl [—Si (CH$_3$)$_3$] groups and hydroxyethyl [—CH$_2$—CH$_2$—OH] groups is conducted by successively adding trimethyl silyl chloride (TMS) and ethylene oxide (OE) and allowing them to react.

In this manner a functionalized PPO suspension is obtained and is treated with a mixture of methanol and water. The functionalized PPO is separated and dried under vacuum in an oven at 70° C. until of constant weight.

Table 1 shows the PPO metalation and functionalization conditions. Specifically, the metalation is effected at temperature of 25° C. for a time of 15 minutes, with the exception of Example 5 in which the duration of metalation is 30 minutes. In Table 1 the term "functionalizing agent (moles %)" means the moles of TMS and OE introduced per 100 moles of PPO. Table 2 shows the functionalized PPO characteristics, determined by $^1$H-NMR spectrum on the basis of the signals attributable to the protons of the different structures present due to the two functional groups introduced. In this table, the headings "methyl (moles %)" and "ring (moles %)" indicate the number of trimethyl silyl and hydroxyethyl groups bonded to the PPO methyl and benzene ring respectively, per 100 moles of PPO.

TABLE 1

| Ex. No. | LiR (moles %) | LiR/PPO (moles) | Functionalizing agent | | Temp (°C.) | Time (min) |
|---|---|---|---|---|---|---|
| | | | (type) | (moles %) | | |
| 1 | 90 | 0.9 | TMS | 59 | 40 | 60 |
| | | | OE | 31 | 40 | 120 |
| 2 | 70 | 0.7 | TMS | 47 | 60 | 60 |

TABLE 1-continued

| Ex. No. | LiR (moles %) | LiR/PPO (moles) | Functionalizing agent (type) | Functionalizing agent (moles %) | Temp (°C.) | Time (min) |
|---|---|---|---|---|---|---|
|   |   |   | OE | 23 | 60 | 120 |
| 3 | 100 | 1.0 | TMS | 50 | 25 | 60 |
|   |   |   | OE | 50 | 25 | 120 |
| 4 | 100 | 1.0 | TMS | 18 | 25 | 60 |
|   |   |   | OE | 82 | 25 | 120 |
| 5 | 100 | 1.0 | TMS | 60 | 25 | 60 |
|   |   |   | OE | 40 | 2 | 120 |

TABLE 2

| Ex. No. | Function | Methyl (moles %) | Ring (moles %) | Total (moles %) | Yield (moles %) | Tg (°C.) |
|---|---|---|---|---|---|---|
| 1 | $-Si(CH_3)_3$ | 27.5 | 12.8 | 40.3 | 68.3 | 196 |
|   | $-CH_2CH_2OH$ | — | 12.8 | 12.8 | 41.3 |   |
| 2 | $-Si(CH_3)_3$ | 27.7 | 18.7 | 46.4 | 98.7 | 195 |
|   | $-CH_2CH_2OH$ | 1.2 | 2.2 | 3.4 | 14.8 |   |
| 3 | $-Si(CH_3)_3$ | 37.0 | 8.0 | 45.0 | 90.0 | 192 |
|   | $-CH_2CH_2OH$ | — | 11.0 | 11.0 | 22.0 |   |
| 4 | $-Si(CH_3)_3$ | 17.7 | — | 17.7 | 98.0 | 200 |
|   | $-CH_2CH_2OH$ | 7.1 | 13.3 | 20.4 | 24.9 |   |
| 5 | $-Si(CH_3)_3$ | 34.3 | 9.6 | 43.9 | 73.0 | 200 |
|   | $-CH_2CH_2OH$ | — | 17.1 | 17.1 | 42.8 |   |

EXAMPLE 6

1 g samples of functionalized PPO obtained as described in each of Examples 1 to 5 is dissolved in 5 ml of chloroform operating at ambient temperture. After leaving to stand for about 15 minutes, each solution is spread over a glass plate by the Gardner knife device (Pacific Scientific Gardner/Neotec Instrument Division) with a 15 mils gap, operating by the ASTM D-823-53 (1970) method, the D-823 procedure then being used to prepare the membrane for testing. The plate is then placed under a bell jar saturated with chloroform vapour at ambient temperature. Solvent removal is continued by allowing the plate to evaporate in the open air for a further 15 minutes under an aspiration hood, and is completed by keeping the plate for 2 hours under vacuum (12-16 mmHg) at 80°-100° C. The membrane is separated by immersing the glass plate in water. The membrane obtained is dried in an oven at 60° C. A circular portion of 11 cm diameter is cut from the membrane for the permeability test.

Table 3 shows the membrane permeability values. Specifically, the test of permeability to the various gases indicated in the table is carried out at 35° C. using the LYSSY apparatus (Lyssy permeameter GMP-200, Analytical Gas Permeability), the permeability coefficients being measured at 35° C. with a difference in partial pressure of the permeating gas of 76 cmHg (unit of measurement: $10^{-10} \cdot ccSTP \cdot cm/cm^2 \cdot sec \cdot cmHg$. The table also gives the values of the ratios $\alpha 1 = P(CO_2)/P(CH_4)$ and $\alpha 2 = P(O_2)/P(N_2)$.

TABLE 3

| Membrane | $P(CO_2)$ | $P(CH_4)$ | $P(O_2)$ | $P(N_2)$ | $\alpha 1$ | $\alpha 2$ |
|---|---|---|---|---|---|---|
| Example 1 | 120 | 12.0 | 28.3 | 7.2 | 10.0 | 3.9 |
| Example 2 | 132 | 15.2 | 33.9 | 8.9 | 8.7 | 3.8 |
| Example 3 | 117 | 11.1 | 31.0 | 7.5 | 10.0 | 4.1 |
| Example 4 | 59.2 | 4.3 | 13.0 | 3.2 | 13.8 | 4.1 |
| Example 5 | 128 | 11.9 | 28.9 | 7.1 | 10.8 | 4.1 |

EXAMPLE 7

3 g of modified PPO in Example 5 are dissolved in 7 g of formylpiperidine (resultant concentration 30% w/w). The solution is left for 4 hours at 40° C. to eliminate any air bubbles present. The solution is then heated to 60° C. and stratified on a glass plate by means of a CAMAG stratifier with a 300 μm fixed gap blade. The plate is left at 60° C. for a time varying from 2 to 10 minutes and is then immersed in a deionized water bath at ambient temperature (about 25° C.). After 2 hours the asymmetric membrane formed is recovered and dried in an oven at 40° C. under vacuum. Permeance measurements on the membrane, of 85 μm apparent thickness, are as follows:

$P(CO_2) = 70 \times 10^{-6} ccSTP/cm^2 \cdot sec \cdot cmHg$
$P(CH_4) = 6.9 \times 10^{-6} ccSTP/cm^2 \cdot sec \cdot cmHg$
$P(O_2) = 16.8 \times 10^{-6} ccSTP/cm^2 \cdot sec \cdot cmHg$
$P(N_2) = 4.5 \times 10^{-6} ccSTP/cm^2 \cdot sec \cdot cmHg$
$P(CO_2)/P(CH_4) = 10.1$
$P(O_2)/P(N_2) = 3.7$ The selectivity demonstrated by the asymmetric membrane is practically identical with that measured for the homogeneous membrane, demonstrating the presence of a compact skin, the thickness of which can be calculated from the permeability/permeance ratio and is about 1.7 μm for the various gases.

EXAMPLE 8

Following the general procedure described in Examples 1 to 5, a modified PPO is prepared having the following characteristics:
$Si(CH_3)_3$ function
  on the methyl: 37.2 moles %
  on the ring: 10.9 moles %
$CH_2CH_2OH$ function
  on the methyl: 0 moles %
  on the ring: 16.7 moles %
glass transition temperature (Tg): 192° C.

The permeability coefficients of such a modified PPO, measured by the procedure described in Example 6 on a dense homogeneous membrane of 50 μm thickness, are as follows:
$P(O_2) = 25.4 \times 10^{-10} ccSTP \cdot cm/cm^2 \cdot sec \cdot cmHg$
$P(N_2) = 6.5 \times 10^{-10} ccSTP \cdot cm/cm^2 \cdot sec \cdot cmHg$
$P(CO_2) = 106 \times 10^{-10} ccSTP \cdot cm/cm^2 \cdot sec \cdot cmHg$
$P(CH_4) = 11.8 \times 10^{-10} ccSTP \cdot cm/cm^2 \cdot sec \cdot cmHg$
$P(CO_2)/P(CH_4) = 3.9$
$P(O_2)/P(N_2) = 9.0$ 70 g of 1-formylpiperidine are added to 30 g of this modified PPO in a glas container with magnetic stirring, temperature-controlled at 50° C. The polymer is completely dissolved in the solvent in a time of 5 hours. 175 for 24 hours at a temperature of 25° C. to eliminate the air bubbles incorporated during the dissolving of the polymer.

The membrane forming system is made ready and temperature-controlled at 60° C. It comprises a metal base support, a flat glass plate, a tray, a loading hopper and a metal blade with a fixed 300 μm gap. The polymer solution is poured into the tray in a quantity sufficient to obtain a membrane with an average surface area of 20–25 cm². When the solution has been poured in the glass plate is moved along the metal support at slow but constant speed below the blade. A visual check is made to ensure that a surface free of bubbles or streaks is formed. The glass plate containing the polymer membrane is immediately immersed in a coagulating bath containing deionized water at a temperature of 25° C. The membrane forms by phase inversion to assume an off-white colour. The formed membrane is left in the bath for about 2 hours.

In the this manner an asymmetrical membrane with an overall thickness of 93.6 μm is formed and is subjected to gas transport analysis. The following permeance values are obtained:

$P(O_2) = 15.1 \times 10^{-6}$ ccSTP/cm²·sec·cmHg
$P(N_2) = 4.0 \times 10^{-6}$ ccSTP/cm²·sec·cmHg
$P(CO_2) = 61.0 \times 10^{-6}$ ccSTP/cm²·sec·cmHg
$P(CH_4) = 6.8 \times 10^{-6}$ ccSTP/cm²·sec·cmHg
$P(CO_2)/P(CH_4) = 8.9$
$P(O_2)/P(N_2) = 3.8$ Knowing the gas permeability coefficient it is possible to calculate the thickness of the active layer of the asymmetric membrane, which in this case is 1.7 μm.

We claim:

1. An amorphous modified poly(2,6-dimethyl-p-oxyphenylene) with a glass transition temperature (Tg) within the range of 170°–220°C., of which the macromolecules contain units having trialkylsilyl groups bonded to the nucleus and/or to the methyl:

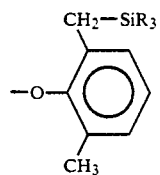

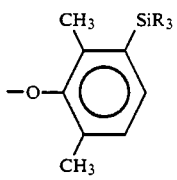 (a)

together with units having hydroxyethyl groups bonded to the nucleus and/or to the methyl:

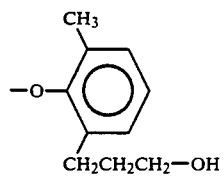

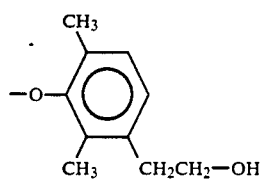 (b)

where:

R is an alkyl containing from 1 to 3 carbon atoms,
the sum of units (a) and units (b) varies from 20 to 20 per 100 moles of poly(2,6-dimethyl-p-oxyphenylene), and
the numerical ratio of units (a) to units (b) varies from 0.5/1 to 30/1.

2. A poly(2,6-dimethyl-p-oxyphenylene) as defined in claim 1, wherein the glass transition temperature (Tg) varies from 190° to 210° C., the sum of units (a) and (b) varies from 35 to 65 per 100 moles of poly(2,6-dimethyl-p-oxyphenylene), and the numerical ratio of units (a) to units (b) varies from 0.8/1 to 15/1.

3. A poly(2,6-dimethyl-p-pxyphenylene) as defined in claim 1, wherein the R in trialkylsilyl units (a) indicates methyl.

4. A process for preparing a modified poly(2,6-dimethyl-p-oxyphenylene) as defined in claim 1, comprising metalating poly(2,6-dimethyl-p-oxyphenylene) with a metalating agent, then reacting the metalated poly(2,6-dimethyl-p-oxyphenylene) obtained in this manner with a trialkylsilylhalide and ethylene oxide in succession.

5. A homogeneous flat membrane for separating gas mixtures, formed from a modified poly(2,6-dimethyl-p-oxyphenylene) as defined in claim 1.

6. An asymmetric flat membrane for separating gas mixtures, formed from a modified poly(2,6-dimethyl-p-oxyphenylene) as defined in claim 1.

7. An amorphous modified poly(2,6-dimethyl-p-oxyphenylene) with a glass transition temperature (Tg) within the range of 170°–220°C., containing units having trialkylsilyl groups bonded to the nucleus and/or to the methyl:

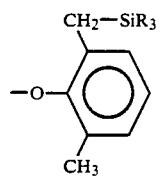

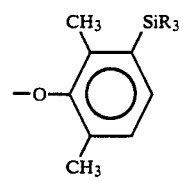 (a)

together with units having hydroxyethyl groups bonded to the nucleus and/or to the methyl:

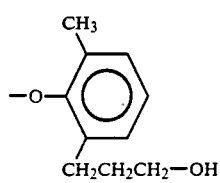

-continued

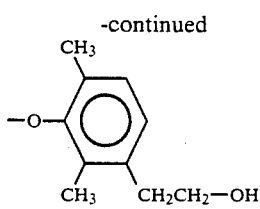 (b)

where
R is an alkyl containing from 1 to 3 carbon atoms, the sum of units (a) and units (b) varies from 20 to 80 per 160 moles of poly(2,6-dimethyl-p-oxyphenylene), and the numerical ratio of units (a) to units (b) varies from 0.5/1 to 30/1;

produced by a process comprising metalating a poly(2,6-dimethyl-p-oxyphenylene) with a metalating agent, then reacting the metalated poly(2,6-dimethyl-p-oxyphenylene) first with a trialkylsilyl halide and then with an ethylene oxide.

* * * * *